United States Patent
Fu et al.

(10) Patent No.: US 10,031,905 B2
(45) Date of Patent: Jul. 24, 2018

(54) MICRO BROWSER SPREADSHEET VIEWER

(71) Applicant: Microsoft Technology Licensing, LLC., Redmond, WA (US)

(72) Inventors: Tsui-Ying Fu, Taipei (TW); Hung Ju King, Taipei (TW); Shao Yi Hung, Taipei (TW); Yung-Yu Tseng, Taipei (TW)

(73) Assignee: Microsoft Technology Licensing, LLC, Redmond, WA (US)

( * ) Notice: Subject to any disclaimer, the term of this patent is extended or adjusted under 35 U.S.C. 154(b) by 107 days.

(21) Appl. No.: 14/586,790

(22) Filed: Dec. 30, 2014

(65) Prior Publication Data

US 2015/0113377 A1     Apr. 23, 2015

Related U.S. Application Data

(62) Division of application No. 12/140,289, filed on Jun. 17, 2008, now abandoned.

(51) Int. Cl.
*G06F 17/00* (2006.01)
*G06F 17/24* (2006.01)
*G06F 17/30* (2006.01)

(52) U.S. Cl.
CPC ............ *G06F 17/246* (2013.01); *G06F 17/30* (2013.01); *G06F 17/30905* (2013.01)

(58) Field of Classification Search
CPC ...................................... G06F 17/30
USPC ......................... 715/212; 345/440
See application file for complete search history.

(56) References Cited

U.S. PATENT DOCUMENTS

| | | | | |
|---|---|---|---|---|
| 5,621,876 A | * | 4/1997 | Odam | G06F 17/246 345/660 |
| 6,005,573 A | * | 12/1999 | Beyda | G06F 3/0485 715/212 |
| 6,115,759 A | * | 9/2000 | Sugimura | G06F 17/246 709/200 |
| 7,181,417 B1 | | 2/2007 | Langseth et al. | |

(Continued)

OTHER PUBLICATIONS

"DataViz," Printed on: Feb. 8, 2008, Available at: http://www.dataviz.com/products/documentstogo/bundle/dxtg_welcome_z8.html, 1 page.

(Continued)

*Primary Examiner* — Mohammed-Ibrahim Zuberi
(74) *Attorney, Agent, or Firm* — Schwegman Lundberg & Woessner, P.A.

(57) ABSTRACT

Various technologies and techniques are disclosed for displaying and managing spreadsheets on mobile devices. An optimized search can be performed. A selection is received from a user to open a spreadsheet. A find selection is received from the use along with keywords for which to the user wishes to search. Any matching keywords are found in the spreadsheet and the cell location of the keywords is retrieved. A results page is constructed that shows search result listings with the keywords along with data surrounding the one or more keywords. The results page is displayed. Navigation options are provided for allowing a user to navigate around the spreadsheet. Right, left, downward, and upward navigation options can be used to change the current view of the spreadsheet by a pre-defined number of cells. Techniques are described for optimizing the display of charts in the spreadsheet.

13 Claims, 24 Drawing Sheets

(56) References Cited

U.S. PATENT DOCUMENTS

| | | | |
|---|---|---|---|
| 7,200,615 | B2 | 4/2007 | Eschbach et al. |
| 7,289,981 | B2 | 10/2007 | Chang et al. |
| 7,299,406 | B2 | 11/2007 | Schnurr |
| 7,630,972 | B2 | 12/2009 | Ott et al. |
| 7,712,027 | B2 | 5/2010 | Yuan et al. |
| 7,937,395 | B2 | 5/2011 | Dexter et al. |
| 2003/0084104 | A1 | 5/2003 | Salem et al. |
| 2004/0139397 | A1 | 7/2004 | Yuan et al. |
| 2005/0273695 | A1 | 12/2005 | Schnurr |
| 2006/0225001 | A1 | 10/2006 | Sylthe et al. |
| 2006/0271520 | A1 | 11/2006 | Ragan |
| 2007/0050448 | A1 | 3/2007 | Gonen et al. |
| 2007/0061751 | A1 | 3/2007 | Cory et al. |
| 2007/0067305 | A1 | 3/2007 | Ives |
| 2007/0074108 | A1 | 3/2007 | Xie et al. |
| 2008/0018928 | A1 | 1/2008 | Meziani et al. |
| 2008/0082938 | A1 | 4/2008 | Buczek |
| 2009/0106200 | A1 | 4/2009 | Salinas et al. |
| 2009/0249418 | A1 | 10/2009 | Gracia et al. |
| 2009/0313537 | A1 | 12/2009 | Fu et al. |
| 2009/0327240 | A1 | 12/2009 | Meehan et al. |
| 2011/0298805 | A1 | 12/2011 | Laurito et al. |

OTHER PUBLICATIONS

"Grid Magic for BlackBerry," Printed on: Feb. 8, 2008 Available at: http://www.simpril.com/gridmagic/, 2 pages.
"PocketGear.com," Printed on: Feb. 8, 2008 Available at: http://classic.pocketgear.com/software_detail.asp?id=5376 1 page.
"Pocket PC Central," Printed on: Feb. 8, 2008 from http://pocketpc-cental.nel/news/2006/october/1_027_cbow_prod.htm, 1 page.
"Quickoffice Premier," Printed on: Feb. 8, 2008 Available at: http://www.quickoffice.com/s60/s60-features.asp, 4 pages.
U.S. Official Action dated Aug. 31, 2011in U.S. Appl. No. 12/140,289.
U.S. Official Action dated Apr. 13, 2012 in U.S. Appl. No. 12/140,289.
U.S. Official Action dated Aug. 2, 2012 in U.S. Appl. No. 12/140,289.
U.S. Official Action dated Nov. 23, 2012 in U.S. Appl. No. 12/140,289.
U.S. Official Action dated Oct. 4, 2013 in U.S. Appl. No. 12/140,289.
U.S. Official Action dated May 7, 2014 in U.S. Appl. No. 12/140,289.
U.S. Official Action dated Sep. 19, 2014 in U.S. Appl. No. 12/140,289.
Shelly, Gary et al., Microsoft Excel 2007: Complete Concepts and Techniques, Jul. 13, 2007, Cengage Learning, pp. 481-482.
Office action for U.S. Appl. No. 12/140,289, dated Mar. 13, 2015, Fu et al., "Micro Browser Spreadsheet Viewer", 24pages.
"U.S. Appl. No. 12/140,289, Amendment and Response filed Jan. 6, 2014 to Non Final Office Action dated Oct. 4, 2013", 15 pgs.
"U.S. Appl. No. 12/140,289, Amendment and Response filed Mar. 20, 2013 to Final Office Action dated Nov. 23, 2012", 10 pgs.
"U.S. Appl. No. 12/140,289, Amendment and Response filed Jul. 3, 2014 to Final Office Action dated May 7, 2014", 12 pgs.
"U.S. Appl. No. 12/140,289, Amendment and Response filed Jul. 3, 2014 to Final Office Action dated Apr. 13, 2012", 10 pgs.
"U.S. Appl. No. 12/140,289, Amendment and Response filed Nov. 2, 2012 to Non Final Office Action dated Aug. 2, 2012", 10 pgs.
"U.S. Appl. No. 12/140,289, Amendment and Response filed Nov. 30, 2011 to Non Final Office Action dated Aug. 31, 2011", 10 pgs.
"U.S. Appl. No. 12/140,289, Reply filed Jul. 20, 2011 to Restriction Requirement dated Jul. 6, 2011", 4 pgs.
"U.S. Appl. No. 12/140,289, Response filed Dec. 19, 2014 to Non Final Office Action dated Sep. 19, 2014", 16 pgs.
"U.S. Appl. No. 12/140,289, Restriction Requirement dated Jul. 6, 2011", 6 pgs.

* cited by examiner

100

```
┌─────────────────────────────────────────┐
│ RECEIVE SELECTION FROM USER TO OPEN A   │
│        SPREADSHEET ON MOBILE DEVICE      │
│                   102                    │
└─────────────────────────────────────────┘
                    │
                    ▼
┌─────────────────────────────────────────┐
│     RECEIVE "FIND" SELECTION FROM USER   │
│                   104                    │
└─────────────────────────────────────────┘
                    │
                    ▼
┌─────────────────────────────────────────┐
│       RECEIVE KEYWORD INPUT FROM USER    │
│                   106                    │
└─────────────────────────────────────────┘
                    │
                    ▼
┌─────────────────────────────────────────┐
│  FIND ALL KEYWORDS IN THE DOCUMENT AND   │
│        RETRIEVE THE CELL LOCATION        │
│                   108                    │
└─────────────────────────────────────────┘
                    │
                    ▼
┌─────────────────────────────────────────┐
│  CONSTRUCT THE RESULTS PAGE WITH DATA    │
│          SURROUNDING THE KEYWORD         │
│                   110                    │
└─────────────────────────────────────────┘
                    │
                    ▼
┌─────────────────────────────────────────┐
│            DISPLAY SEARCH RESULT         │
│                   112                    │
└─────────────────────────────────────────┘
```

ABC.XLSX

FOUND RESULT – "PDA" FOUND IN RANGE A1 – H50

1. B19 /244    242

| | SMARTPHONES-ENHANCED | 307.2 |
|---|---|---|
| AFRICA | CELLULAR PDAS | 304.3 |
| EASTERN EUROPE | BASIC PHONES | 70.2 |

2. B29

| | SMARTPHONES-ENHANCED | 0.0 |
|---|---|---|
| EASTERN EUROPE | CELLULAR PDAS | 103.9 |
| JAPAN | BASIC PHONES | 112.2 |

3. B34

| | SMARTPHONES-ENHANCED | 0.0 |
|---|---|---|
| JAPAN | CELLULAR PDAS | 0.0 |
| LATIN AMERICA | BASIC PHONES | 92.0 |

ABC.XLSX

SEARCH RESULTS FOR "CHINESE"
LISTED BY ROW

322 — CELL
A9  | CHINESE | CHINA | 14.76 |
    | 7 | 20.96 | 4 | 29.34 |

324

A32 | CHINESE | HONG KONG |
    | 1.94 | 28 | 2.09 | 32 |

A53 | CHINESE | TAIWAN 5.75 |
    | 15 | 7.01 | 15 | 8.02 |

ABC.XLSX

[MENU]

552 —

| | A | B | C | D |
|---|---|---|---|---|
| 1 | TABLE1-3 SALES OF MOBILE TERMINALS TO END USERS BY TECHNOLOGY- 2001-2003 WORLD WIDE, 2001-2009 (THOUSANDS OF UNITS) | | | |
| 2 | | 2001 | 2002 | 2003 |
| 3 | ANALOG | 6,000 | 839.4 | 139.3 |
| 4 | CDMA200FT | 3,154 | 91,804.3 | 112,97.1 |
| 5 | CDMA2000FX | - | 1,132.2 | 7,048.8 |
| 6 | CDMAIS95A | - | - | - |
| 7 | CDMAIS95B | 47,867 | 9,393.1 | 1,443.4 |
| 8 | EDGE | 17,527 | 251.8 | 1,095.9 |
| 9 | GMT | - | 2,037.7 | 13,087.3 |
| 10 | GPRS | - | 200.8 | - |
| 11 | GSM | 10,192.3 | 246,269.8 | 353,529.0 |
| 12 | HSCSD | 233,475.7 | 103,194.1 | 116,537.9 |
| 13 | GMSA20K | - | - | 354.0 |

554 —

"A" COLUMN IS FROZEN

ABC.XLSX

[MENU]

562 — | | A | C | D | E |
| --- | --- | --- | --- | --- |
| 1 | TABLE1-3 SALES OF MOBILE TERMINALS TO END USERS BY TECHNOLOGY- 2001-2003 WORLD WIDE, 2001-2009 (THOUSANDS OF UNITS) | | | |
564 — | 2 | | 2002 | 2003 | 2004 |
| 3 | ANALOG | 6,000 | 839.4 | 139.3 |
| 4 | CDMA2000 1X | 3,154 | 91,804.3 | 112,97.1 |
| 5 | CDMA2000 1X | - | 1,132.2 | 7,048.8 |
| 6 | CDMA2000 1X | - | - | - |
| 7 | CDMA IS-95A | 47,867 | 9,393.1 | 1,443.4 |
| 8 | CDMA IS-95B | 17,527 | 251.8 | 1,095.9 |
| 9 | EDGE | - | 2,037.7 | 13,087.3 |
| 10 | GMT | - | 200.8 | - |
| 11 | GPRS | 10,192.3 | 246,269.8 | 353,529.0 |
| 12 | GSM | 233,475.7 | 103,194.1 | 116,537.9 |
| 13 | GSMCDMA00 | - | - | 354.0 |
| 14 | HSCO | 6,206.9 | | 84.6 |

FIG. 23

MICRO BROWSER SPREADSHEET VIEWER

CROSS-REFERENCE TO RELATED APPLICATION

This application is a divisional of, and claims priority to commonly owned U.S. patent application Ser. No. 12/140,289 filed Jun. 17, 2008, entitled "Micro Browser Spreadsheet Viewer," abandoned, which is herein incorporated by reference in its entirety.

BACKGROUND

In today's world of technology, it is easier than ever before to access information while traveling. For example, laptop computers often have wireless internet access to corporate networks to allow users to access critical data when needed. Similarly, mobile devices are becoming more and more advanced, and most mobile phones and PDAs today provide the user with access to the Internet and sometimes company documents from within the small viewing window that the mobile phone or PDA has to offer.

As with most advances in technology, there are also some challenges. Mobile phones and PDAs have very small screens for displaying information to end users. So even though these devices may have a fast Internet connection for retrieving large documents, there is still an issue with finding the best ways to fit that information onto the small screen of the mobile device for the user to view it.

SUMMARY

Various technologies and techniques are disclosed for displaying and managing spreadsheets on mobile devices. An optimized search can be performed. A selection is received from a user to open a spreadsheet. A find selection is received from the use along with keywords for which to the user wishes to search. Any matching keywords are found in the spreadsheet and the cell location of the keywords is retrieved. A results page is constructed that shows search result listings with the keywords along with data surrounding the one or more keywords. The results page is displayed.

In one implementation, navigation options are provided for allowing a user to navigate around the spreadsheet. A selection is received from a user to open a spreadsheet. A portion of the spreadsheet is displayed in a current view. When the spreadsheet contains additional columns of data on a right side of any columns being displayed in the current view, a right navigation option is provided that when selected will shift the spreadsheet rightward by a pre-defined number of cells. When the spreadsheet contains additional columns of data on a left side of any columns being displayed in the current view, a left navigation option is provided that when selected will shift the spreadsheet leftward by the pre-defined number of cells. When the spreadsheet contains additional rows of data on a lower side of any rows being displayed in the current view, a down navigation option is provided that when selected will shift the spreadsheet downward by the pre-defined number of cells. When the spreadsheet contains additional rows of data on an upper side of any rows being displayed in the current view, an up navigation option is provided that when selected will shift the spreadsheet upward by the pre-defined number of cells.

In another implementation, techniques are described for optimizing the display of charts in the spreadsheet. A selection is received from a user to open a spreadsheet on a mobile device. When the spreadsheet being opened contains a chart, an icon is displayed instead of the chart. A selection is received from the user to view the chart. The chart is then displayed in the spreadsheet for the user to view and interact with.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 1 is a process flow diagram for one implementation illustrating the stages involved in performing a search for data on a micro browser spreadsheet viewer on a mobile device.

FIG. 3 is a simulated screen for one implementation that illustrates an exemplary search results listing with the matching data displayed along with surrounding data.

FIG. 7 is a simulated screen for one implementation that illustrates an exemplary search results listing with the matching data displayed by row along with surrounding data.

FIG. 22 is a simulated screen for one implementation that illustrates that the selected column has been frozen.

FIG. 23 is a simulated screen for one implementation that illustrates the data having been shifted one cell to the right, but the frozen column still remaining in place.

DETAILED DESCRIPTION

The technologies and techniques herein may be described in the general context as an application that enables spreadsheets to be browsed in a micro browser on a mobile device, but the technologies and techniques also serve other purposes in addition to these. In one implementation, one or more of the techniques described herein can be implemented as features within a mobile device spreadsheet program such as MICROSOFT® Excel Mobile, from within a content management application such as MICROSOFT® SharePoint, and/or from any other type of program or service that stores and/or interfaces with spreadsheets that are displayed on a mobile device.

In one implementation, a micro browser spreadsheet viewer is described that allows a user to view and optionally manage spreadsheets from a mobile device such as a mobile phone or PDA in an efficient manner. The term "micro browser spreadsheet viewer" as used herein is meant to include a spreadsheet program that is designed to operate with a small viewing window, such as a screen of a mobile device. The micro browser spreadsheet viewer is designed to provide a rich user experience for interacting with spreadsheets, but within the confines of the limited screen space offered on such mobile devices. For example, the user is able to navigate both horizontally and vertically through the spreadsheet using a series of navigation options (e.g. buttons or otherwise). A find technique is offered that displays multiple search results on a page along with a context of the surrounding data from the cells that surround the matching keyword that was being searched for. Row and column freezing is made available for the spreadsheet. Alternatively or additionally, images and charts are initially rendered as icons so that their load time and/or download time can be reduced, and/or the screen real estate preserved until the user is ready to view them.

While the techniques herein are described in the context of a micro browser spreadsheet viewer on a mobile device, some or all of these techniques could also be used in other spreadsheet programs running on a larger device such as a desktop computer or laptop computer and still prove beneficial to end users.

Turning now to FIGS. 1-23, the stages for implementing one or more implementations of micro browser spreadsheet viewer are described in further detail. In some implementations, the processes of FIG. 2-23 are at least partially implemented in the operating logic of computing device 600 (of FIG. 24).

Figure 2:
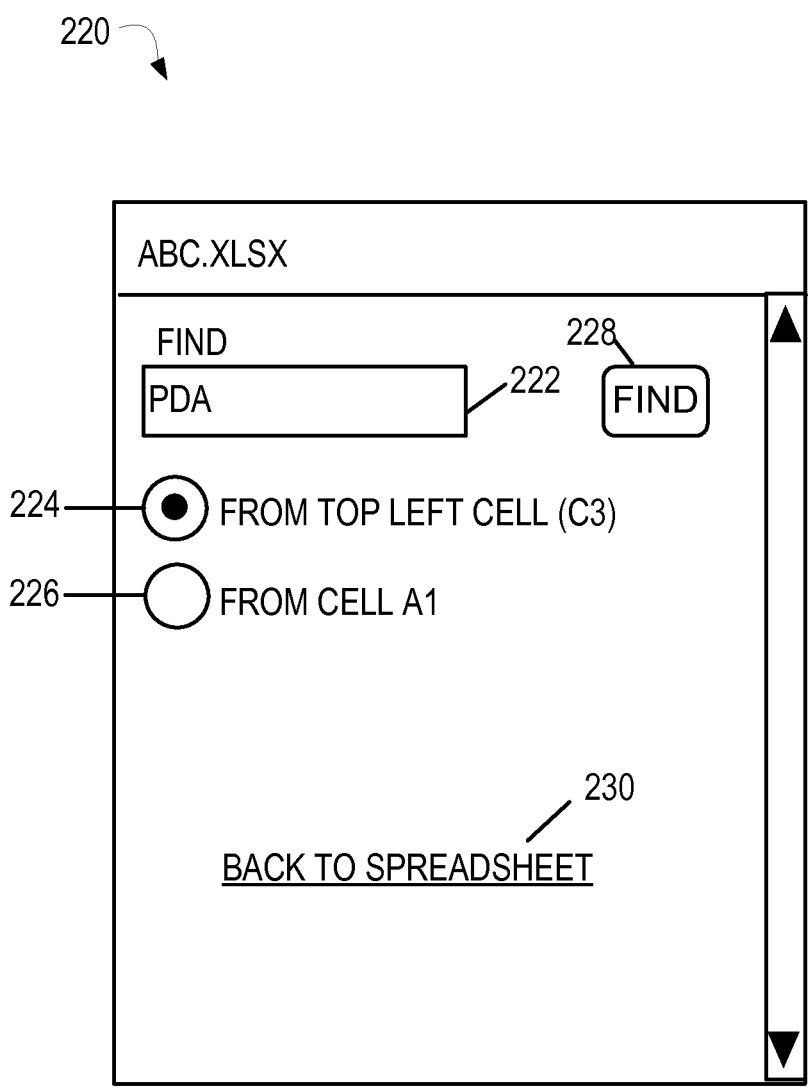
FIG. 2 is a simulated screen for one implementation that illustrates selection of a location at which to begin the search.
Figure 4:
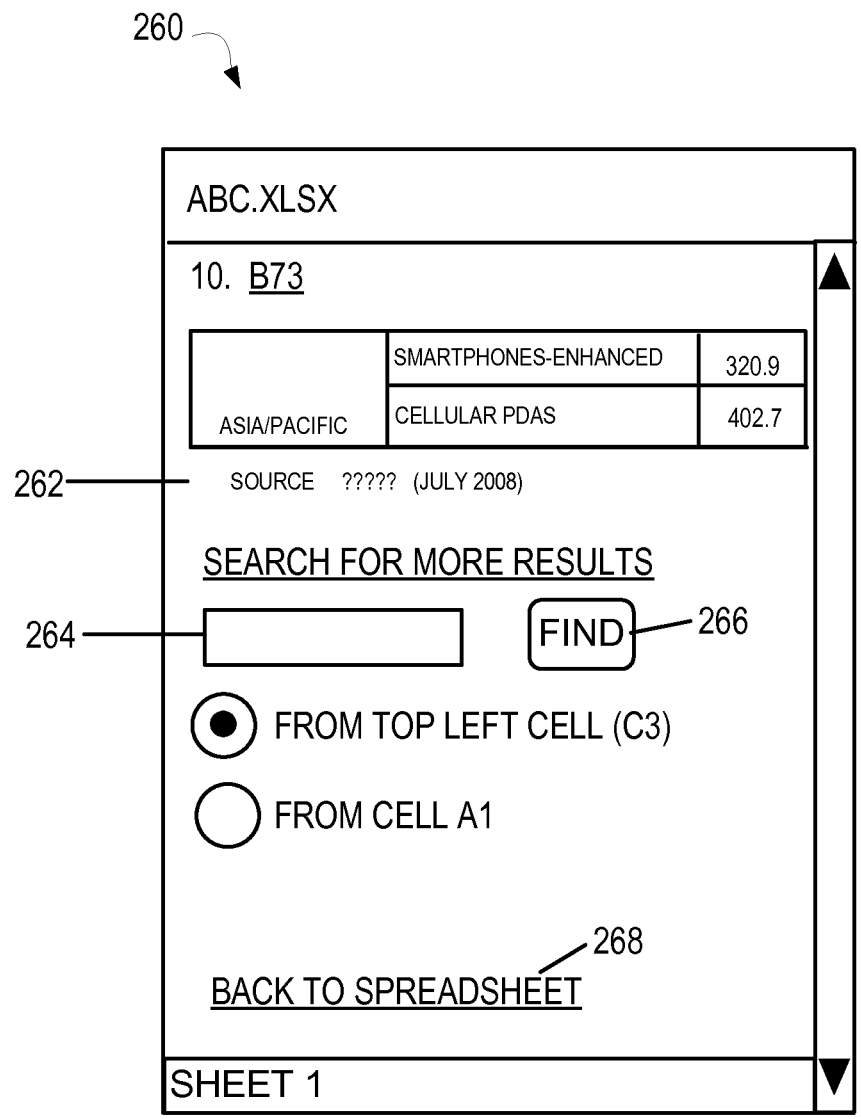
FIG. 4 is a simulated screen for one implementation that illustrates additional search options that can also be used.

FIG. 1 is a process flow diagram 100 for one implementation illustrating the stages involved in performing a search for data contained in a spreadsheet from within a micro browser spreadsheet viewer on a mobile device. A selection is received from a user to open a spreadsheet on a mobile device (stage 102). A find selection is received from the user (stage 104). Keyword input is received from the user (stage 106). Any matching keywords that are contained in the document are found, and their respective cell locations are retrieved (stage 108). A results page is constructed with data surrounding the keyword (stage 110). In other words, data for some of the rows and/or columns that surround the cell where the matching keyword is located can also be retrieved. The search results are then displayed to the user in one or more search results listings (stage 112), which can include the cell name and data from the cell containing the keyword, and some of the surrounding data to give the user further context. The user can then select an entry in the search results listing and go to that particular location in the spreadsheet. FIGS. 2-4 describe some exemplary screens which illustrate this search process in further detail.

FIG. 2 is a simulated screen 220 for one implementation that illustrates selection of a location at which to begin the search. In the example shown, the user enters the key word criteria 222 to search for in the document. The user can also select the location in the spreadsheet to search, such as from the top left cell 224 or from the first cell 226. Upon selecting the find option 228, a search is performed to see if the keyword is present in one or more locations in the spreadsheet. The results of the search are then displayed to the user in a screen such as the one illustrated in FIG. 3.

FIG. 3 is a simulated screen 240 for one implementation that illustrates an exemplary search results listing with the matching data displayed along with surrounding data. In this example, the keyword that was being searched for in the spreadsheet was PDA. The keyword PDA was located in at least three different positions within the spreadsheet. If the data that surrounds the keyword is also displayed for each search result listing. For example, the keyword PDA was located in cell B 19 (244). This data is shown in the center 242 of the search results for that listing, along with the other surrounding rows and columns. This allows the user to see the data in its original context, and to then select a particular search result to navigate to that portion of the spreadsheet. It will be appreciated that while the search results listing in FIG. 3 are shown in a 3×3 format, numerous other variations for displaying the search results could also be used in other implementations.

FIG. 4 is a simulated screen 260 for one implementation that illustrates additional search options that can be used. In the example shown, additional search options are displayed after the end of the search results data being displayed on that page 262. One of the search options includes a find field 264, which allows the user to enter a keyword to search for in the spreadsheet. The location at which to begin the search can also be specified. A find option 266 can be selected to perform another search. If the user is finished performing a search, then option 268 can be selected to go back to the spreadsheet.

Figure 5:
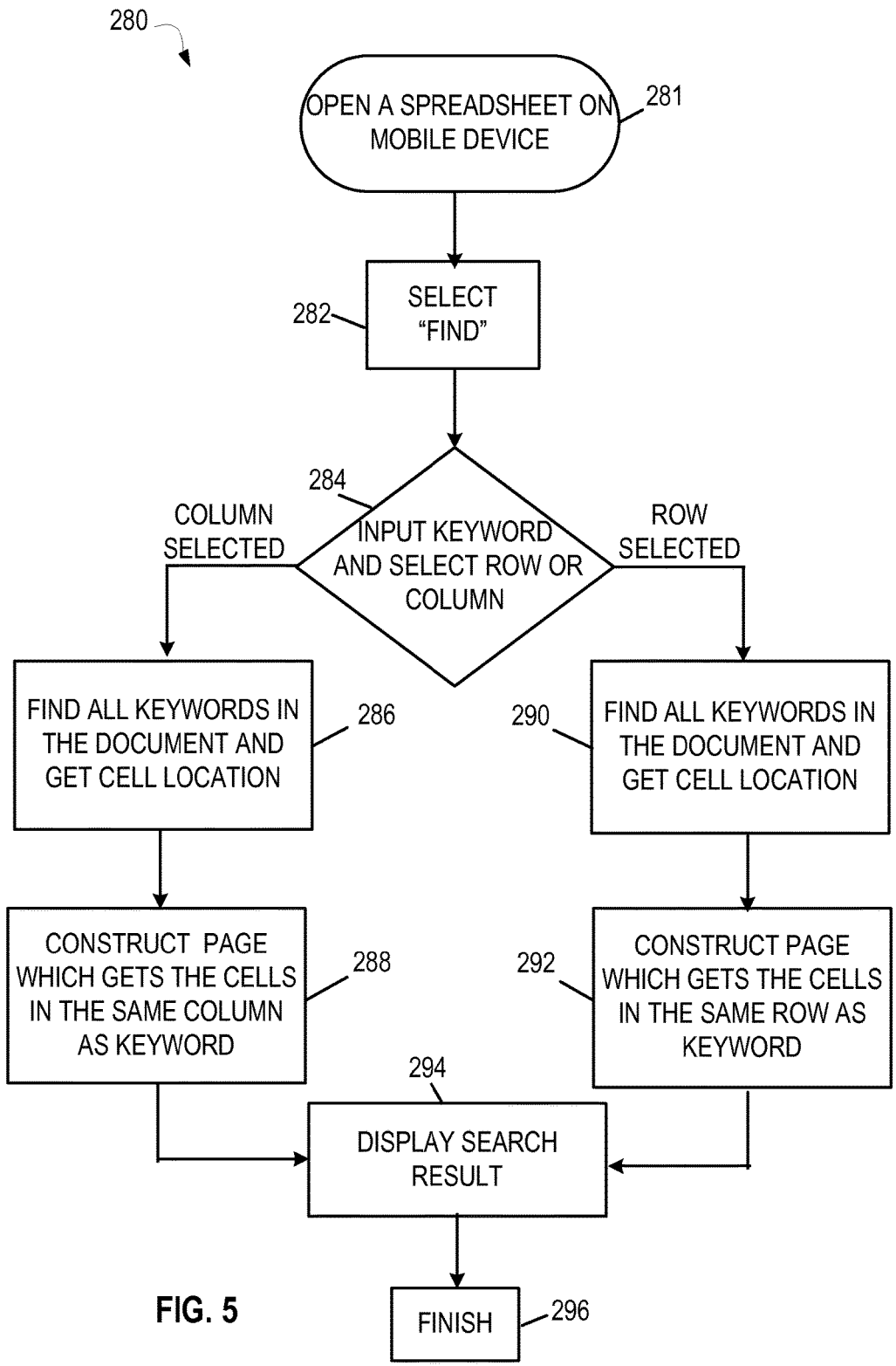
FIG. 5 is a process flow diagram for one implementation illustrating the stages involved in performing a search based upon a row or column selection.

FIG. 5 is a process flow diagram 280 for one implementation illustrating the stages involved in performing a search based upon a row or column selection. A spreadsheet is opened on a mobile device (stage 281). A user selects a find option (stage 282). The user inputs one or more keywords and selects a row or column on which to base the search (stage 284). If a column search was selected, then all matching keywords are found in the document in their cell locations retrieved (stage 286). If a row search was selected, then all matching keywords are found in the document and their cell locations retrieved (stage 290). In either scenario, a results page is constructed by retrieving the cells that are in the same column or row as the keyword (stage 288). The search result is displayed to the user (stage 294) and the process ends (stage 296). The simulated screens of FIGS. 6 and 7 illustrate this process in further detail.

Figure 6:
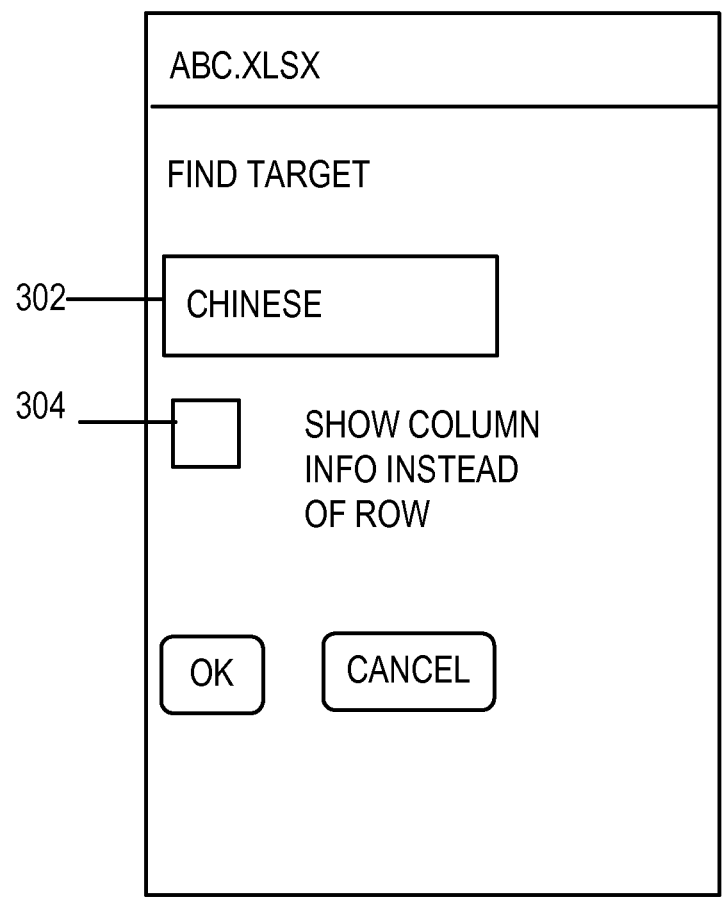
FIG. 6 is a simulated screen for one implementation that illustrates allowing a user to select row or column search options.

FIG. 6 is a simulated screen 300 for one implementation that illustrates allowing a user to select row or column search options. After entering the keyword(s) 302 for which to search, the user can select a row or column option 304 to indicate whether the search should be limited to values contained in a certain row or column.

Figure 8:
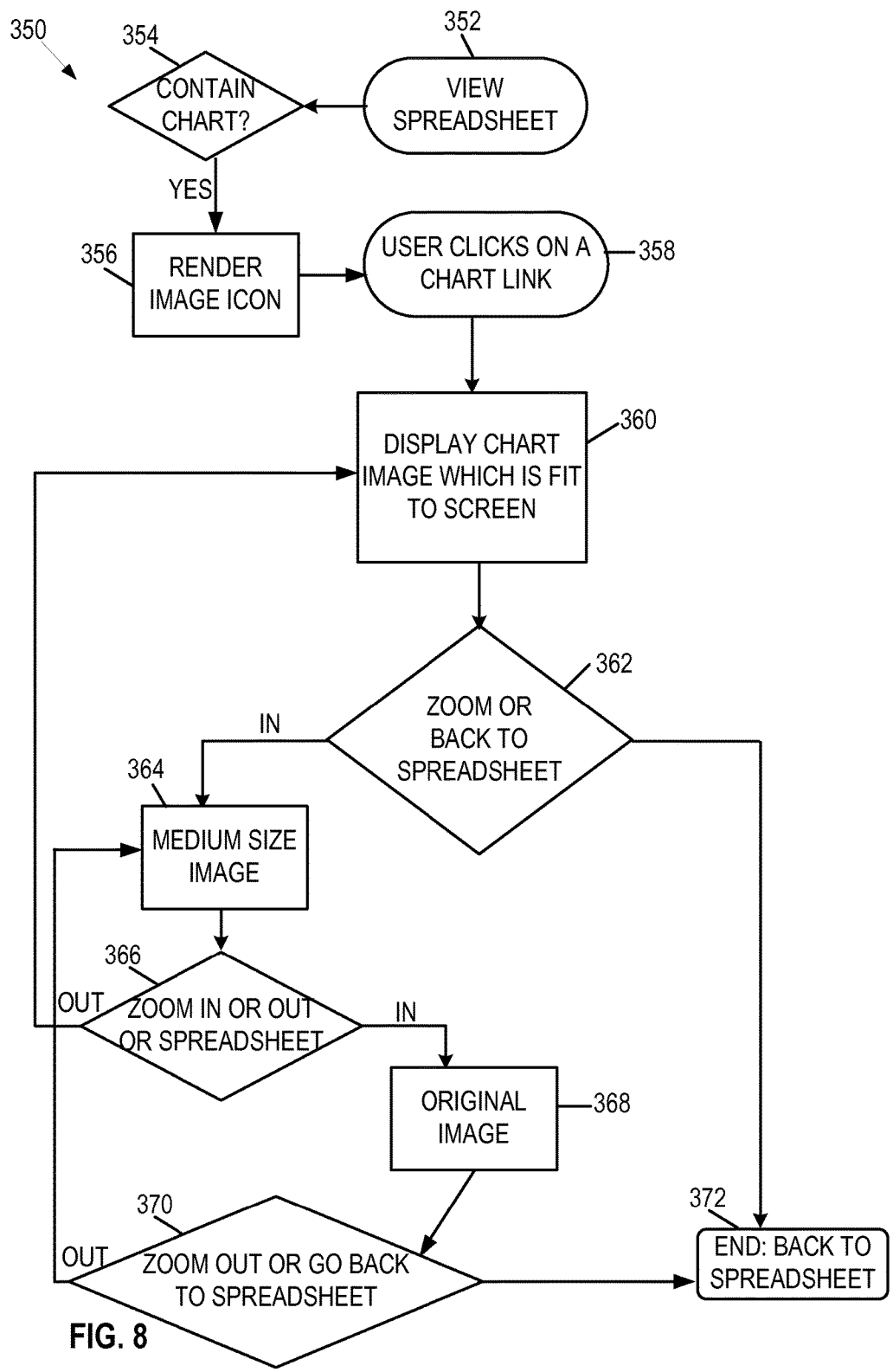
FIG. 8 is a process flow diagram for one implementation illustrating the stages involved in rendering a chart within a micro browser spreadsheet viewer on a mobile device.

Turning now to FIG. 7, a simulated screen 320 is shown for one implementation that illustrates an exemplary search results listing with the matching data displayed by row along with surrounding data. Since a row option was chosen on FIG. 6, the search was limited to the row that was selected when the search was initiated. In another implementation, the user can be prompted to specify which row to use for the search. The cells that contained the matching keywords are then displayed, along with the surrounding data for that cell. For example, cell A9 (322) contains the word Chinese 324, which was the keyword being searched for in this example FIG. 8 is a process flow diagram 350 for one implementation illustrating the stages involved in rendering a chart or other image within a micro browser spreadsheet viewer on a mobile device. A spreadsheet is displayed for the user to view (stage 352). If the spreadsheet contains a chart (or other image) (decision point 354), then the chart is rendered as an image icon or other representation (graphic or textual) (stage 356). The term "chart" as used herein is meant to include any type of graphic chart, image, photo, etc. that may be present in a spreadsheet. In one implementation, different types of icons are used to visually indicate the type of chart it is. For example, if the chart is a bar chart, then the icon representing the chart can have a bar chart graphic. If the chart is a photo such as a jpg, then the icon can display a graphic or other representation to show that it is a jpg format.

In one implementation, the chart is initially rendered as an icon in order to save time for downloading the chart from an online web server that is storing the spreadsheet, when applicable. Alternatively or additionally, any costs associated with download transfer fees (i.e. internet data transfer costs) can be saved until the information is actually needed. In another implementation, the chart is initially rendered as an icon in order to save screen real estate until the user is ready to view the information.

When the user wishes to actually view the chart, then the user can click on a chart link or other chart view option (stage 358), and the chart image is retrieved (when applicable) and then displayed, such as in a mode which is fit to the screen (stage 360). The user is able to zoom in further on the chart, or to return back to the spreadsheet (stage 362). If the user selects an option to zoom in, then a larger (medium size) image is shown (stage 364). The user can choose to further zoom in to the original size of the image, to zoom out, or to return to the spreadsheet (stage 366).

From the original size of the image, if the user selects an option to zoom out, then a medium size image is shown (stage 364). If the user chooses to zoom in a second time, then the original and larger size of the image is shown (stage 368). The user can choose to zoom out or go back to the spreadsheet (stage 370). At any point upon selecting an option to return to the spreadsheet, the zooming process ends and the user is returned to the spreadsheet (stage 372). It will be appreciated that the zoom in and zoom out examples described in FIG. 8 are just provided for the sake of illustration. In other implementations, various other zoom in or zoom out combinations could also be supported. The process of FIG. 8 will now be described in further detail with the simulated screens of FIGS. 9-12.

Figure 9:
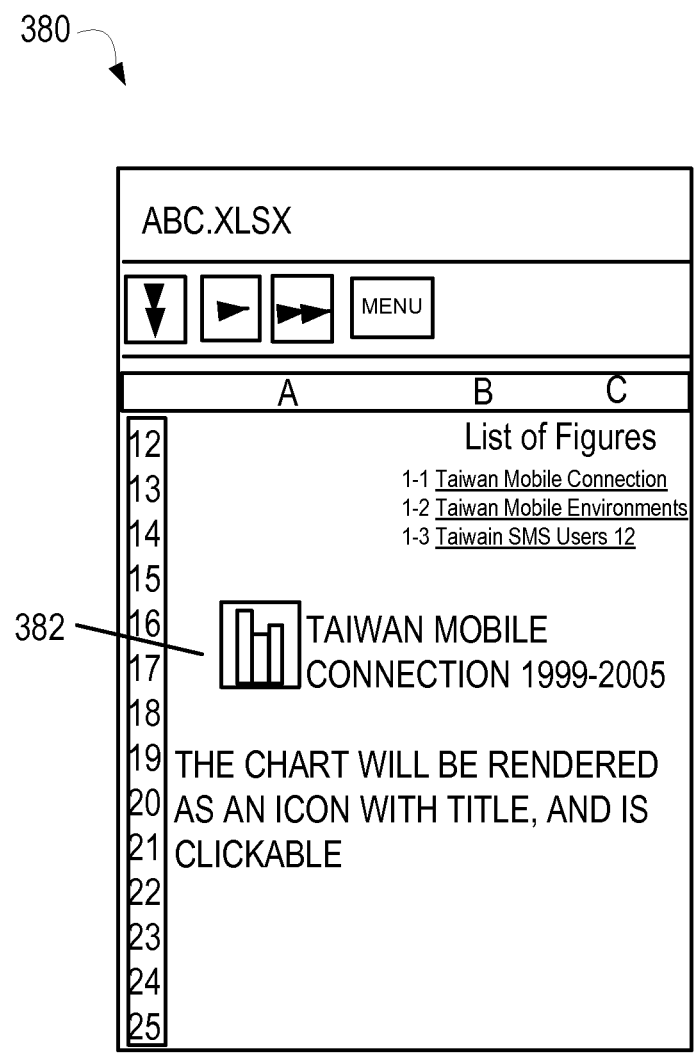
FIG. 9 is a simulated screen for one implementation that illustrates initially rendering a chart with just a simple icon and a title.

FIG. 9 is a simulated screen 380 for one implementation that illustrates initially rendering a chart with just a simple icon and a title. In the position where the chart appears in the original spreadsheet, an icon 382 along with the title of the chart is displayed. In one implementation, the user can view the actual chart by selecting the icon 382. In one implementation, by showing the chart in a simple icon format initially, resources can be saved by not rendering a chart unless and until the end user wishes to view it.

Figure 10:
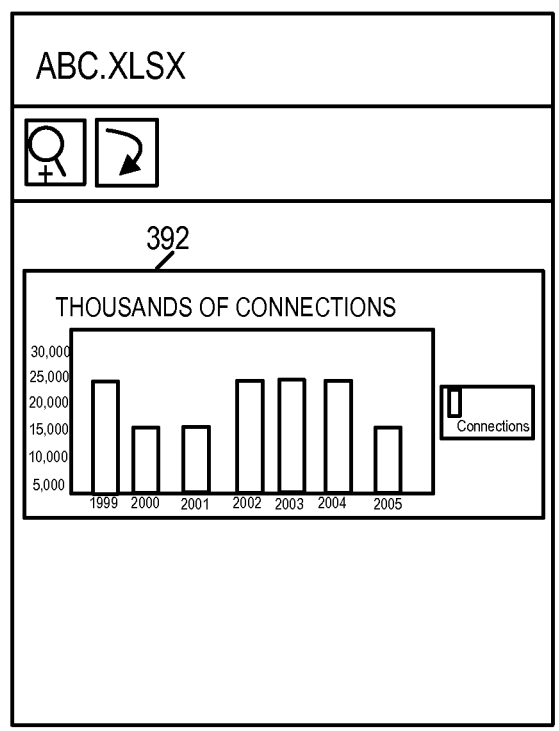
FIG. 10 is a simulated screen for one implementation that illustrates an exemplary view of the chart that can be displayed when the user selects the simple icon that represents the chart.

FIG. 10 is a simulated screen 390 for one implementation that illustrates an exemplary view of the chart that can be displayed when the user selects the simple icon that represents the chart. In the example shown in FIG. 10, the chart is displayed in a format that is fit according to the current window 392 so the user can see a small version of the entire chart. Upon selecting the chart, or upon otherwise selecting a zoom in option, a larger view of the chart can be displayed. An example of this is shown in FIG. 11.

Figure 11:
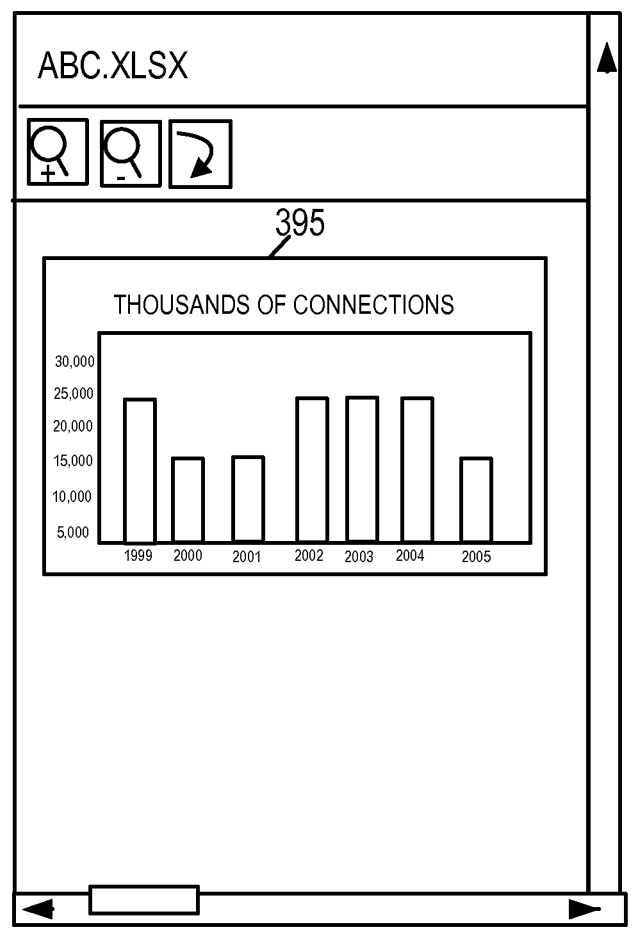
FIG. 11 is a simulated screen for one implementation that illustrates a zoomed in view of the chart shown in FIG. 10.

FIG. 11 is a simulated screen 394 for one implementation that illustrates a zoomed in view 395 of the chart shown in FIG. 10. Again, upon selecting the chart, or upon otherwise selecting a zoom in option, a larger view of the chart can be displayed. An example of this is shown in FIG. 12.

Figure 12:
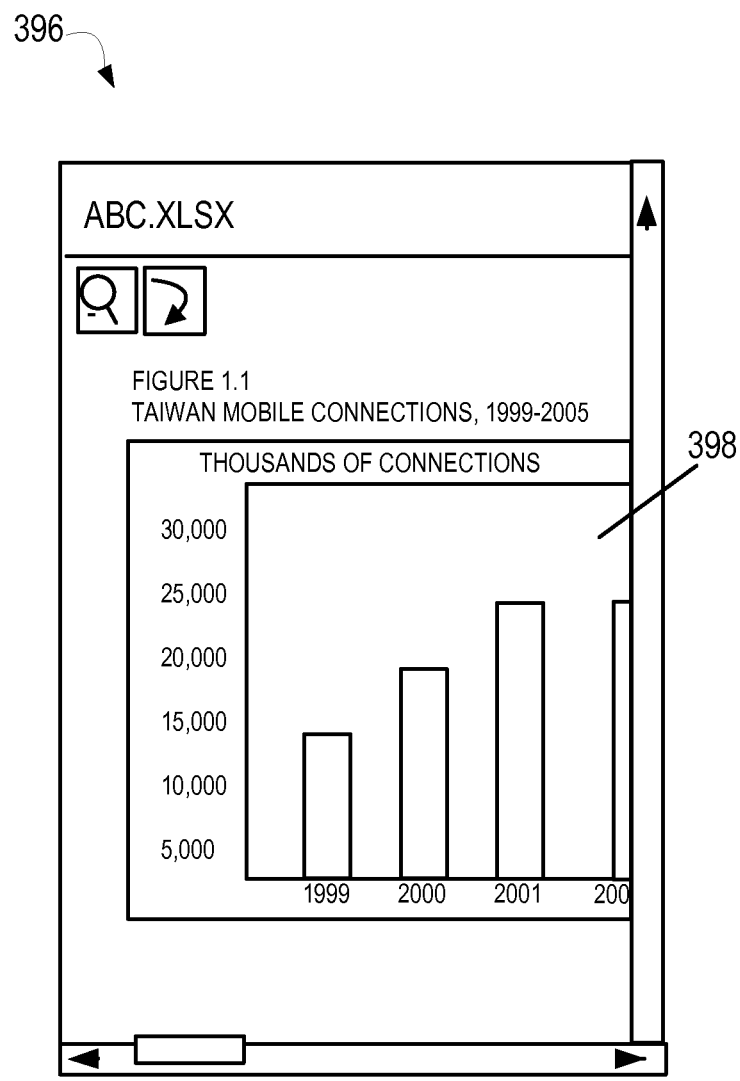
FIG. 12 is a simulated screen for one implementation that illustrates a zoomed in view of the chart shown in FIG. 11.

FIG. 12 is a simulated screen 396 for one implementation that illustrates a zoomed in view of the chart shown in FIG. 11. In the example view of FIG. 12, the chart is being displayed in its original size 398, which causes a portion of it to chop off of the screen.

Figure 13:
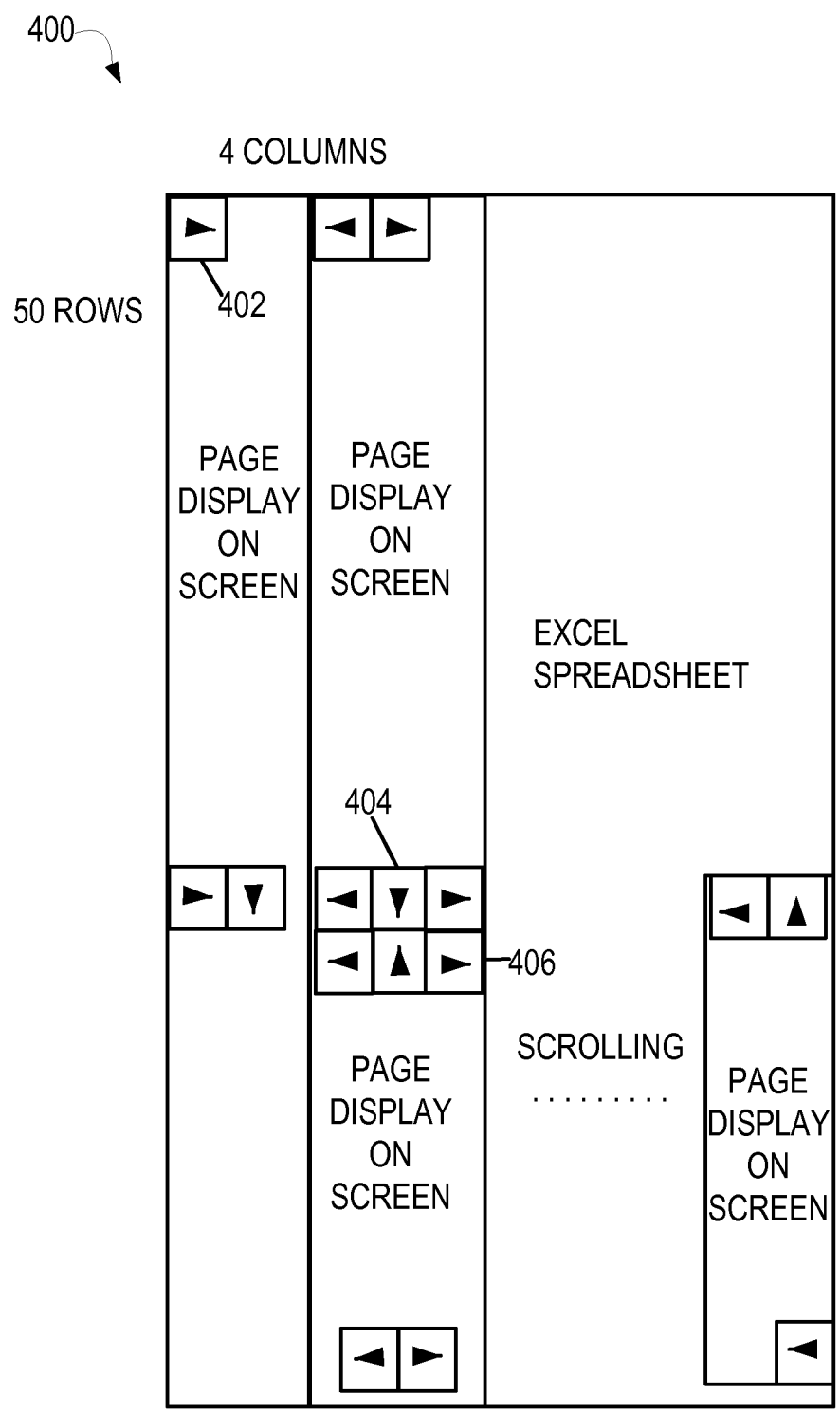
FIG. 13 is a diagrammatic view of one implementation that illustrates an exemplary navigation structure for navigating portions of the spreadsheet one section at a time.

Turning now to FIGS. 13-16, some exemplary navigation features for navigating around the spreadsheet in a micro browser spreadsheet viewer are illustrated. FIG. 13 is a diagrammatic view 400 of one implementation that illustrates an exemplary navigation structure for navigating portions of the spreadsheet one section at a time. Using right, left, down, and up navigation options, the user is able to control which cells of the spreadsheet are shown at a given time. For example, when the spreadsheet is first opened, a small portion of the entire spreadsheet is displayed initially on the screen as the current view. Upon selecting a right navigation option 402, the next region to the right of the initial page is then displayed that shows additional columns for the current rows of data. From the second page being displayed on the screen, if the user selects a down navigation option 404, then the spreadsheet view shifts down several rows to reach the next region of the spreadsheet. If the user then wishes to navigate to the right, then the user can select a right navigation option 406 to further scroll to the right to see additional columns in the current region. An up navigation option can also be used as appropriate to shift the spreadsheet upward. These navigation concepts will now be illustrated graphically in FIGS. 14-16.

Figure 14:
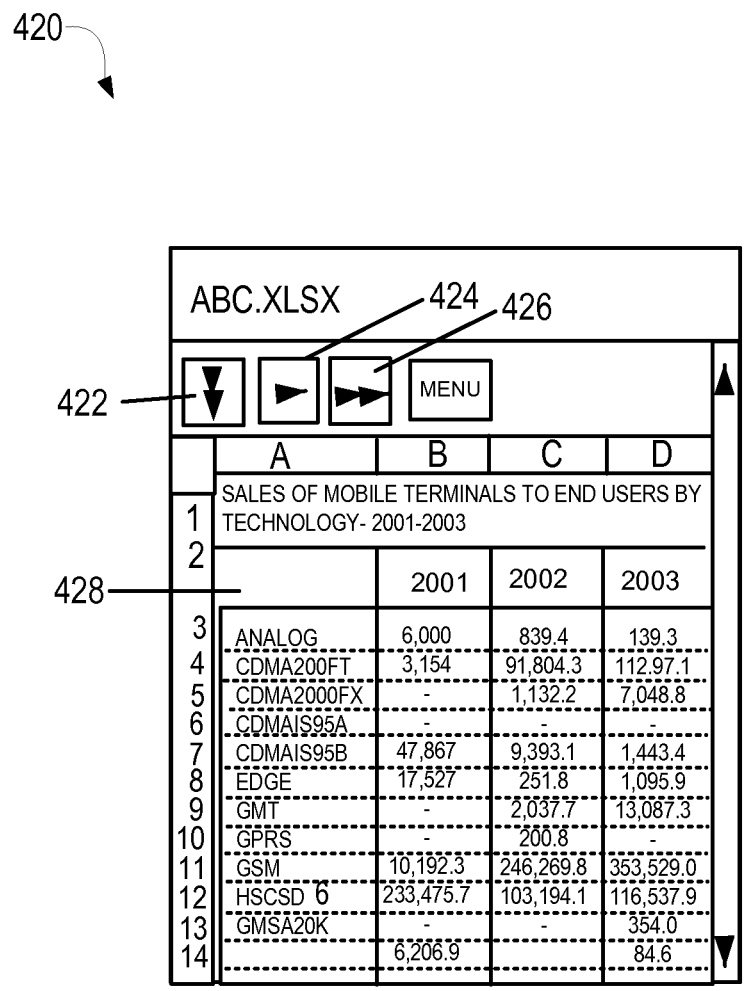
FIG. 14 is a simulated screen for one implementation that illustrates an initial view of spreadsheet data that begins in an upper left corner of the spreadsheet.

FIG. 14 is a simulated screen 420 for one implementation that illustrates an initial view of spreadsheet data 428 that begins in an upper left corner of the spreadsheet. Upon selecting next row set option 422, the rows that are displayed get shifted by a pre-defined number of rows (such as fifty rows). Upon selecting right navigation option 424, the columns that are displayed get shifted so that columns E, F, G, and H are shown for rows 1 through 14, for example. Upon selecting next column set option 426, the columns that are displayed get shifted by a pre-defined number of columns (such as four columns).

Figure 15:
FIG. 15 is a simulated screen for one implementation that illustrates some exemplary navigation and other options that appear at the bottom of the current view of spreadsheet data.

FIG. 15 is a simulated screen 430 for one implementation that illustrates some exemplary navigation and other options that appear at the bottom of the current view of spreadsheet data. If the user scrolls to the bottom of the data region being displayed in FIG. 14, then some additional navigation and other options are presented. For example, the user can select a next row set option 432, next column option 434, next column set option 436, an option to go to one or more other sheets 438, an option to freeze a particular column or row 440, or to view certain display settings 442. The user can select an option to go to the first cell (A1) 444, to go back to the entry point 446, or to see the document properties 448. These navigation and other options are just provided for the sake of illustration, and numerous other variations could also be used instead of or in addition to these.

Figure 16:
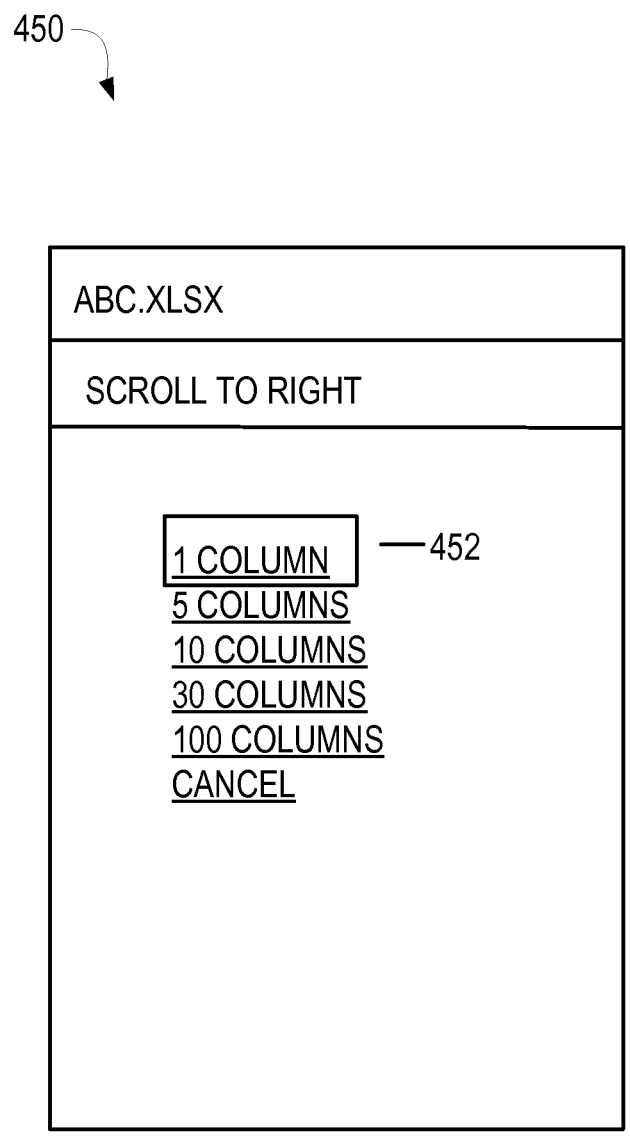
FIG. 16 is a simulated screen for one implementation that illustrates an exemplary navigation screen that can be displayed when a user selects a navigation button.

FIG. 16 is a simulated screen 450 for one implementation that illustrates an exemplary navigation screen that can be displayed when a user selects a navigation button. In this example, the user is first prompted to specify how many columns to the right the data should be shifted. As screen such as FIG. 16 can be shown in an alternate implementation, such as instead of the next row set option (432 on FIG. 15) and/or the next column set option (436 on FIG. 15) that were displayed directly on the navigation bar and in the bottom region of the spreadsheet. Upon receiving the user's selection 452 of the number of columns to scroll to the right, then the spreadsheet view is updated accordingly. In other implementations, the view simply shifts by a pre-determined or user-defined setting that had specified the number of rows or columns to shift so that the user is not prompted to specify the information every time he/she navigates through the document.

Figure 17:
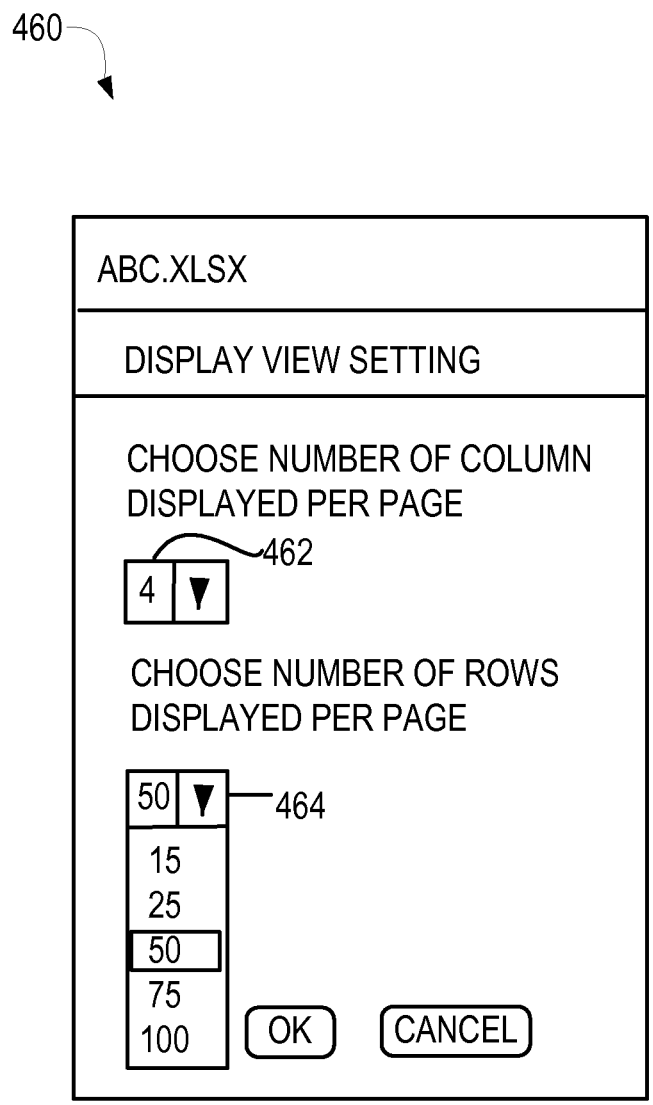
FIG. 17 is a simulated screen for one implementation that illustrates an exemplary settings screen that enables the user to customize various display settings.

FIG. 17 is a simulated screen 460 for one implementation that illustrates an exemplary settings screen that enables the user to customize various display settings. In this example, the user is able to choose a column option 462 to set the number of columns to be displayed per page, along with a row option 464 to set the number of rows to be displayed per page.

Figure 18:
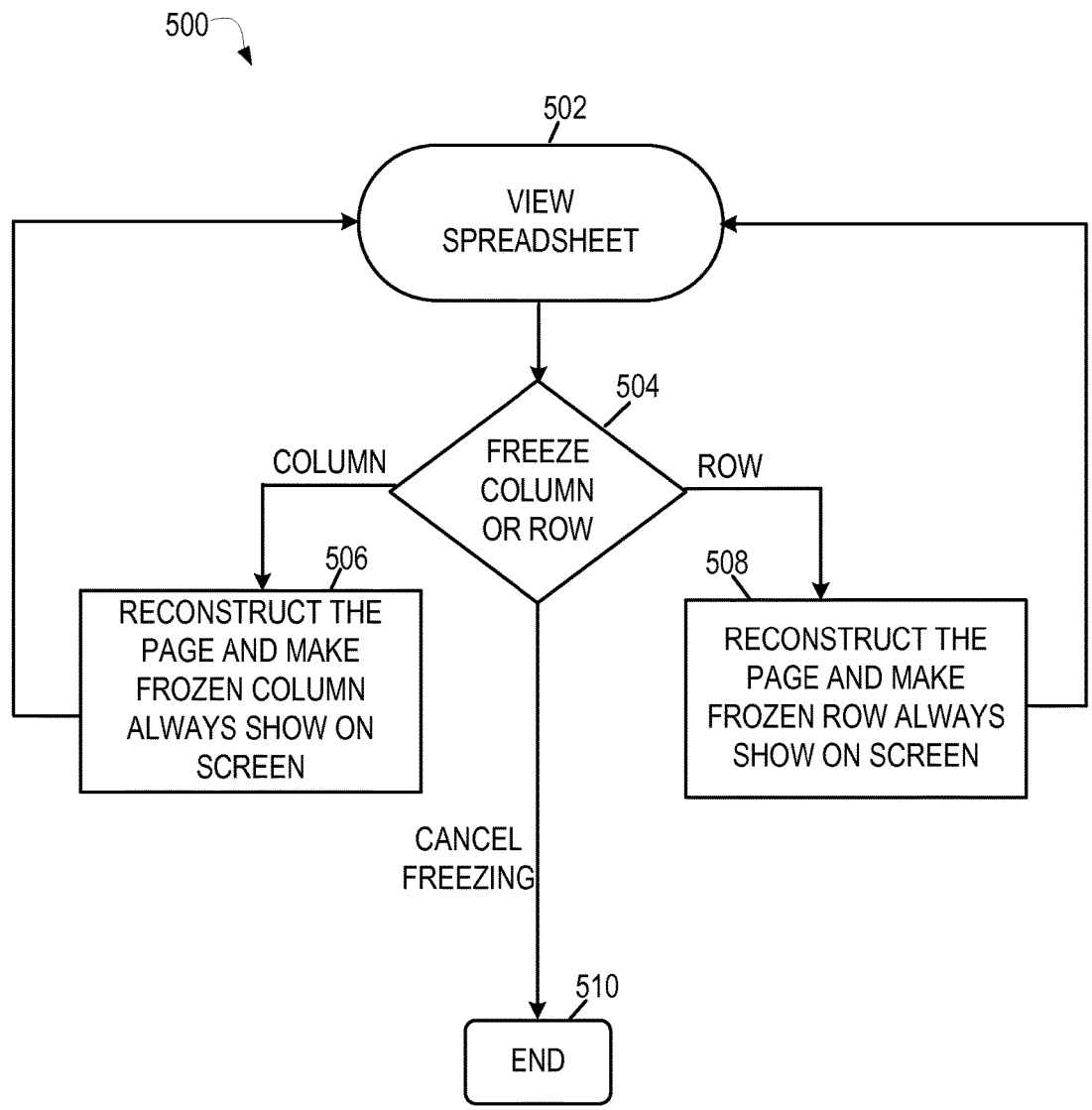
FIG. 18 is a process flow diagram for one implementation illustrating the stages involved in enabling a user to freeze a selected column or row in the spreadsheet.

Turning now to FIGS. 18-23, options for freezing one or more portions of the spreadsheet from within the micro browser spreadsheet viewer are described. FIG. 18 is a process flow diagram 500 for one implementation illustrating the stages involved in enabling a user to freeze a selected column or row in the spreadsheet. While the user is viewing a spreadsheet (stage 502), he or she can select an option to freeze a column or row (stage 504). If an option is chosen to freeze a particular column, then the page is reconstructed to make sure that the frozen column always displayed on the screen (stage 506). If an option is chosen to freeze a particular row, then the page is reconstructed to make sure that the frozen row always displayed on the screen (stage 508). When the user cancels freezing, the process ends at end point 510. FIGS. 19-23 are simulated screens that illustrate the row and column freezing features in further detail.

Figure 19:
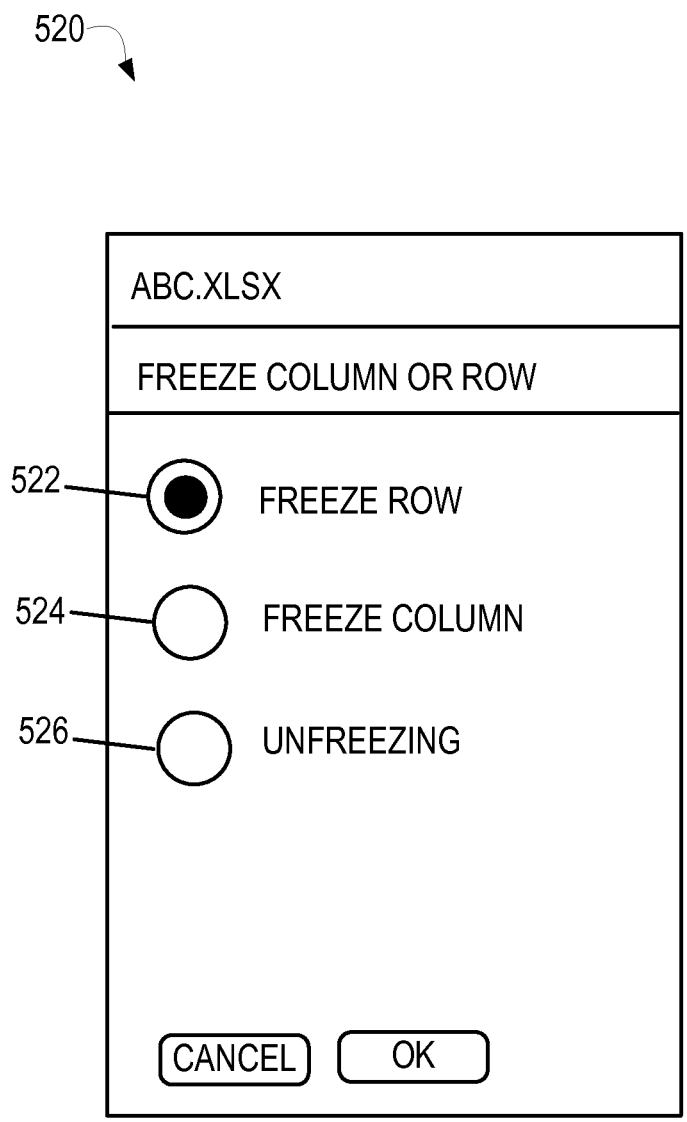
FIG. 19 is a simulated screen for one implementation that illustrates allowing a user to choose an option for whether to freeze a row or a column.
Figure 20:
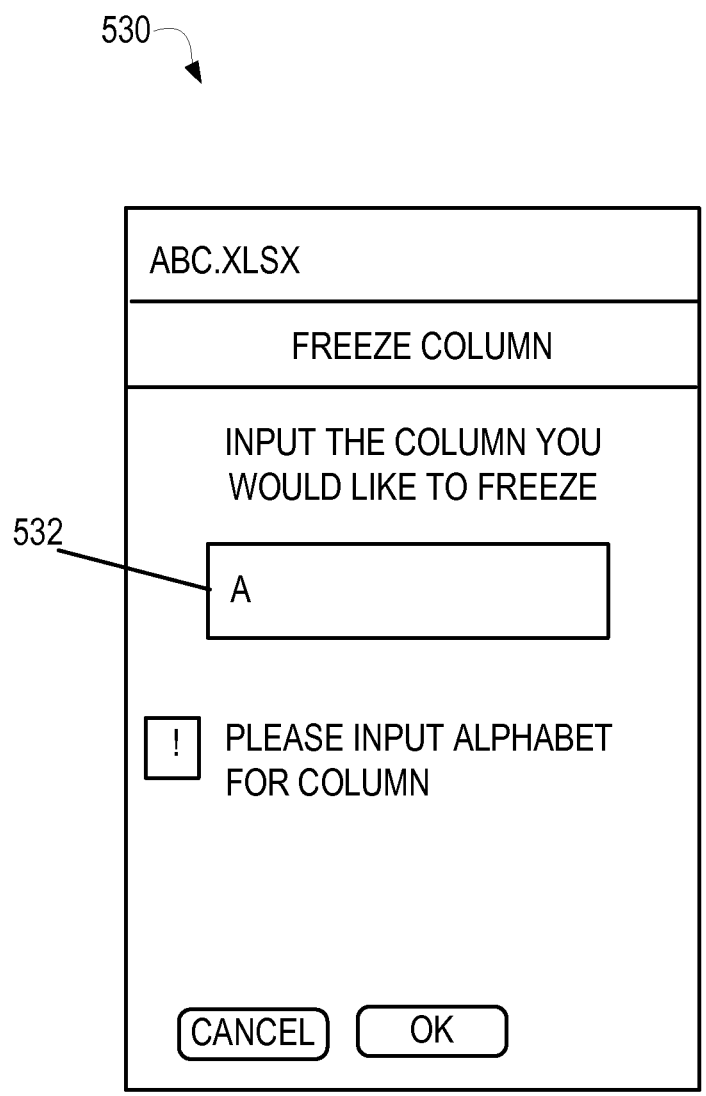
FIG. 20 is a simulated screen for one implementation that illustrates allowing a user to select the specific column to freeze.
Figure 21:
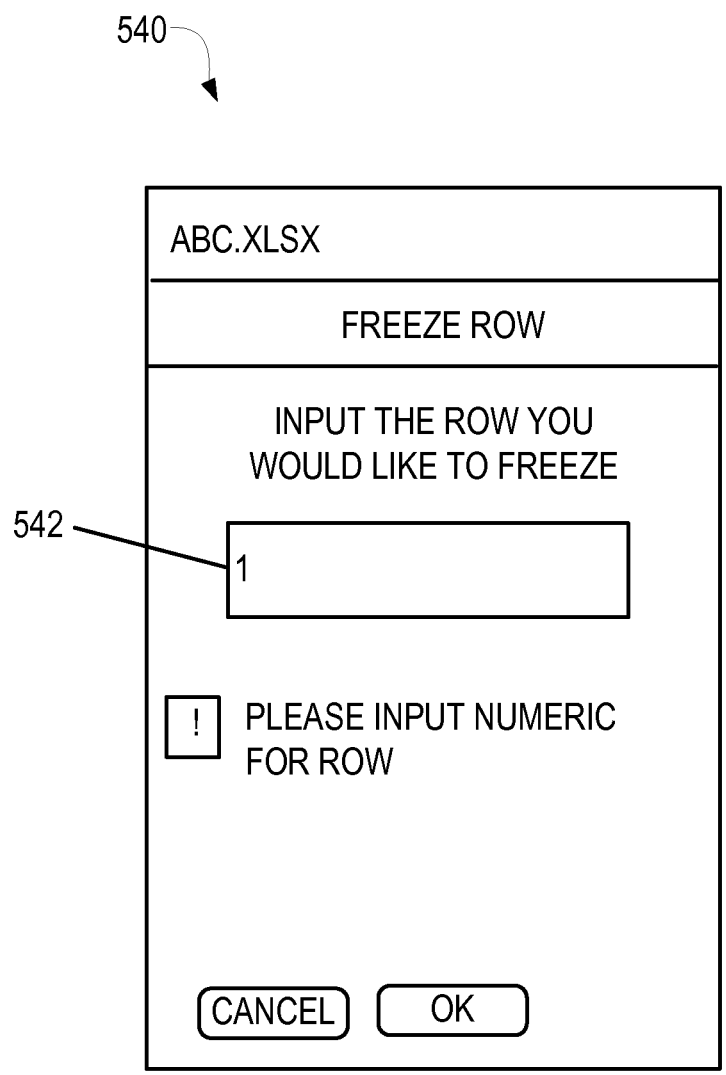
FIG. 21 is a simulated screen for one implementation that illustrates allowing a user to select the specific row to freeze.

FIG. 19 is a simulated screen 520 for one implementation that illustrates allowing a user to choose an option for whether to freeze a row 522 or to freeze a column 524. In one implementation, the same options screen also contains an unfreeze option 526 to allow the user to turn off the freezing option. Upon selecting the option to freeze a column 524, a screen similar to the simulated screen 530 of FIG. 20 is displayed. Screen 530 allows the user to input the specific column 532 that he or she would like to freeze. Returning to FIG. 19, upon selecting the option to freeze a row 522, a screen similar to the simulated screen 540 of FIG. 21 is displayed. Screen 540 allows the user to input the specific row 542 that he or she would like to freeze. Upon selecting one of the options to freeze a particular row or column, the spreadsheet view is then updated so that the selected row or column stays in place even while the user navigates the rest of the document.

FIG. 22 is a simulated screen 550 for one implementation that illustrates that the selected column has been frozen. In the example shown, Column A 552 has been frozen, and the data that can shift left and right begins with Column B 554.

FIG. 23 is a simulated screen 560 for one implementation that illustrates the data having been shifted one cell to the right 564, but the frozen column (Column A 562 in this example) still remaining in place.

Figure 24:
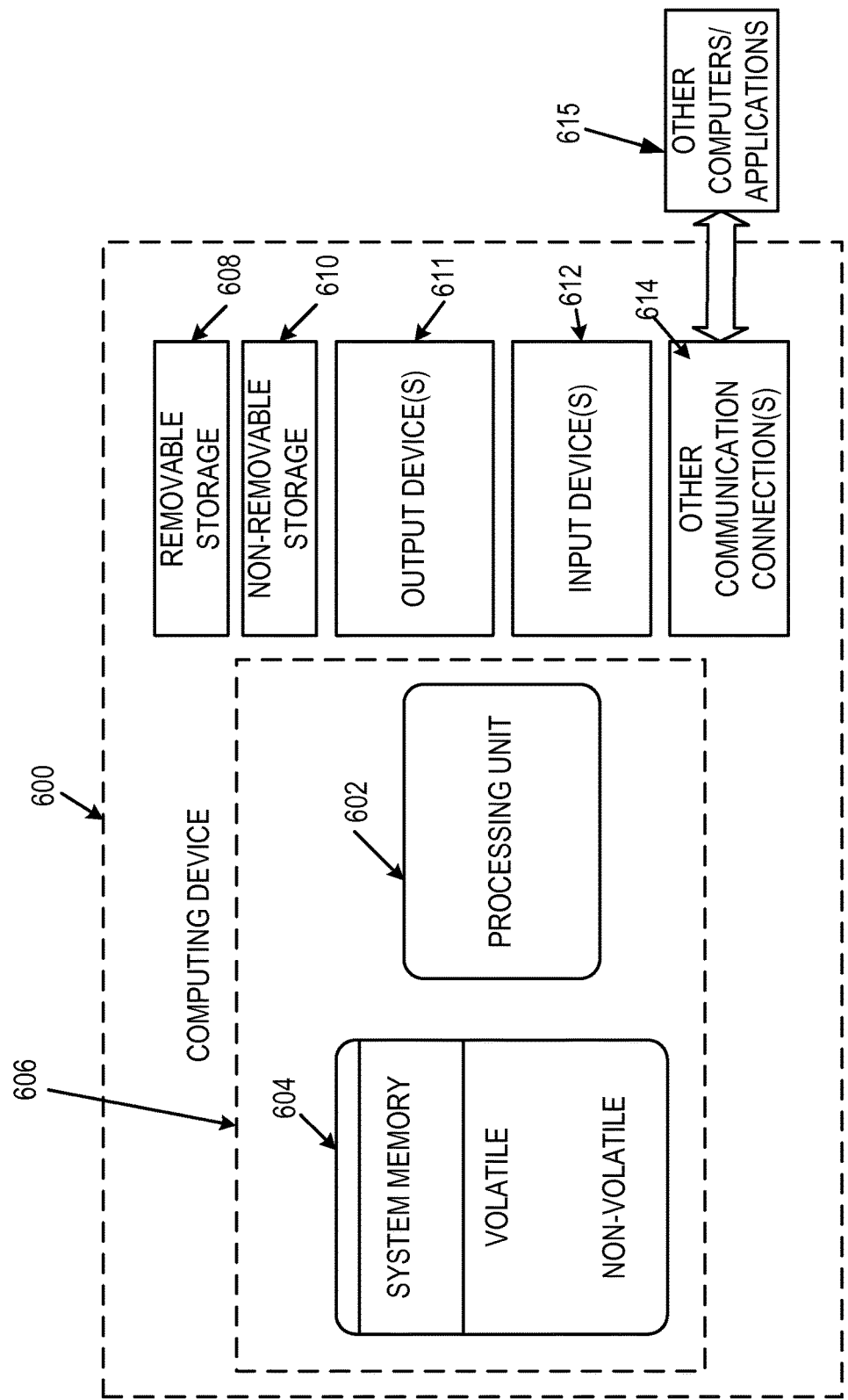
FIG. 24 is a diagrammatic view of a computer system of one implementation.

As shown in FIG. 24, an exemplary computer system to use for implementing one or more parts of the system includes a computing device, such as computing device 600. In its most basic configuration, computing device 600 typically includes at least one processing unit 602 and memory 604. Depending on the exact configuration and type of computing device, memory 604 may be volatile (such as RAM), non-volatile (such as ROM, flash memory, etc.) or some combination of the two. This most basic configuration is illustrated in FIG. 24 by dashed line 606.

Additionally, device 600 may also have additional features/functionality. For example, device 600 may also include additional storage (removable and/or non-removable) including, but not limited to, magnetic or optical disks or tape. Such additional storage is illustrated in FIG. 24 by removable storage 608 and non-removable storage 610. Computer storage media includes volatile and nonvolatile, removable and non-removable media implemented in any method or technology for storage of information such as computer readable instructions, data structures, program modules or other data. Memory 604, removable storage 608 and non-removable storage 610 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 600. Any such computer storage media may be part of device 600.

Computing device 600 includes one or more communication connections 614 that allow computing device 600 to communicate with other computers/applications 615. Device 600 may also have input device(s) 612 such as keyboard, mouse, pen, voice input device, touch input device, etc. Output device(s) 611 such as a display, speakers, printer, etc. may also be included. These devices are well known in the art and need not be discussed at length here.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the examples discussed herein could be organized differently on one or more computers to include fewer or additional options or features than as portrayed in the examples.

What is claimed is:

1. Non-transitory computer storage media having computer-executable instructions for causing a computer to perform steps comprising:
   displaying a plurality of user-selectable options that correspond to at least one of a pre-defined number of rows or a pre-defined number of columns;
   receiving a selection from a user as to at least one of the pre-defined number of rows or the pre-defined number of columns from the plurality of user-selectable options, the number being greater than one;
   receiving a selection from the user to open a spreadsheet;
   displaying a portion of the spreadsheet in a current view;
   when the spreadsheet contains additional columns of data on a right side of any columns being displayed in the current view, providing a right navigation option that when selected will shift the spreadsheet rightward by the pre-defined number of columns;
   when the spreadsheet contains additional columns of data on a left side of any columns being displayed in the current view, providing a left navigation option that when selected will shift the spreadsheet leftward by the pre-defined number of columns;
   when the spreadsheet contains additional rows of data on a lower side of any rows being displayed in the current view, providing a down navigation option that when selected will shift the spreadsheet downward by the pre-defined number of rows; and
   when the spreadsheet contains additional rows of data on an upper side of any rows being displayed in the current view, providing an up navigation option that when selected will shift the spreadsheet upward by the pre-defined number of rows.

2. The non-transitory computer storage media of claim 1, further having computer-executable instructions for causing a computer to perform steps comprising:
   receiving a selection from a user to freeze a row or column of the spreadsheet.

3. The non-transitory computer storage media of claim 2, further having computer-executable instructions for causing a computer to perform steps comprising:
   prompting the user to specify the row or column to freeze.

4. The non-transitory computer storage media of claim 3, further having computer-executable instructions operable to cause a computer to perform steps comprising:
   freezing the row or column that was specified by the user as the user navigates through the spreadsheet.

5. The non-transitory computer storage media of claim 4, further having computer-executable instructions for causing a computer to perform steps comprising:
   receiving a selection from a user to unfreeze the row or column; and
   unfreezing the row or column in the spreadsheet.

6. A computer-implemented method, the method comprising:
   displaying a plurality of user-selectable options that correspond to at least one of a pre-defined number of rows or a pre-defined number of columns;
   receiving a selection from a user as to at least one of the pre-defined number of rows or the pre-defined number of columns from the plurality of user-selectable options, the number being greater than one;
   receiving a selection from the user to open a spreadsheet;
   displaying a portion of the spreadsheet in a current view;
   when the spreadsheet contains additional columns of data on a right side of any columns being displayed in the current view, providing a right navigation option that when selected will shift the spreadsheet rightward by the pre-defined number of columns;
   when the spreadsheet contains additional columns of data on a left side of any columns being displayed in the current view, providing a left navigation option that when selected will shift the spreadsheet leftward by the pre-defined number of columns;
   when the spreadsheet contains additional rows of data on a lower side of any rows being displayed in the current view, providing a down navigation option that when selected will shift the spreadsheet downward by the pre-defined number of rows; and
   when the spreadsheet contains additional rows of data on an upper side of any rows being displayed in the current view, providing an up navigation option that when selected will shift the spreadsheet upward by the pre-defined number of rows.

7. The computer-implemented method of claim 6, further comprising:
   receiving a selection from a user to freeze a row or column of the spreadsheet.

8. The computer-implemented method of claim 7, further comprising:
   prompting the user to specify the row or column to freeze.

9. The computer-implemented method of claim 8, further comprising:
   freezing the row or column that was specified by the user as the user navigates through the spreadsheet.

10. The computer-implemented method of claim 9, further comprising:
    receiving a selection from a user to unfreeze the row or column; and
    unfreezing the row or column in the spreadsheet.

11. Non-transitory computer storage media having computer-executable instructions for causing a computer to perform steps comprising:
    displaying a plurality of user-selectable options that correspond to at least one of a pre-defined number of rows or a pre-defined number of columns;
    receiving a selection from a user from the user-selectable options as to at least one of the predetermined number of rows to display or the predetermined number of columns to display, the number being greater than one;
    receiving a selection from a user to open a spreadsheet;
    displaying a portion of the spreadsheet in a current view, the portion being determined by at least one of the predetermined number of rows or the predetermined number of columns;
    when the spreadsheet contains additional columns of data on a right side of any columns being displayed in the current view, providing a right navigation option that when selected will shift the spreadsheet rightward;
    when the spreadsheet contains additional columns of data on a left side of any columns being displayed in the current view, providing a left navigation option that when selected will shift the spreadsheet leftward;
    when the spreadsheet contains additional rows of data on a lower side of any rows being displayed in the current view, providing a down navigation option that when selected will shift the spreadsheet downward; and
    when the spreadsheet contains additional rows of data on an upper side of any rows being displayed in the current view, providing an up navigation option that when selected will shift the spreadsheet upward.

12. The non-transitory computer storage media of claim 11, further having computer-executable instructions for causing a computer to perform steps comprising:

receiving a selection from a user as to a pre-defined number of columns by which to shift;

receiving a request from the user to shift left or right; and shifting the spreadsheet left or right, respectively, by the pre-defined number of columns.

13. The non-transitory computer storage media of claim 11, further having computer-executable instructions for causing a computer to perform steps comprising:

receiving a selection from a user as to a pre-defined number of rows by which to shift;

receiving a request from the user to shift up or down; and shifting the spreadsheet up or down, respectively, by the pre-defined number of rows.

\* \* \* \* \*